June 12, 1923.
H. W. BELL
SPRING SUSPENSION
Filed Dec. 24, 1920
1,458,318
3 Sheets-Sheet 1
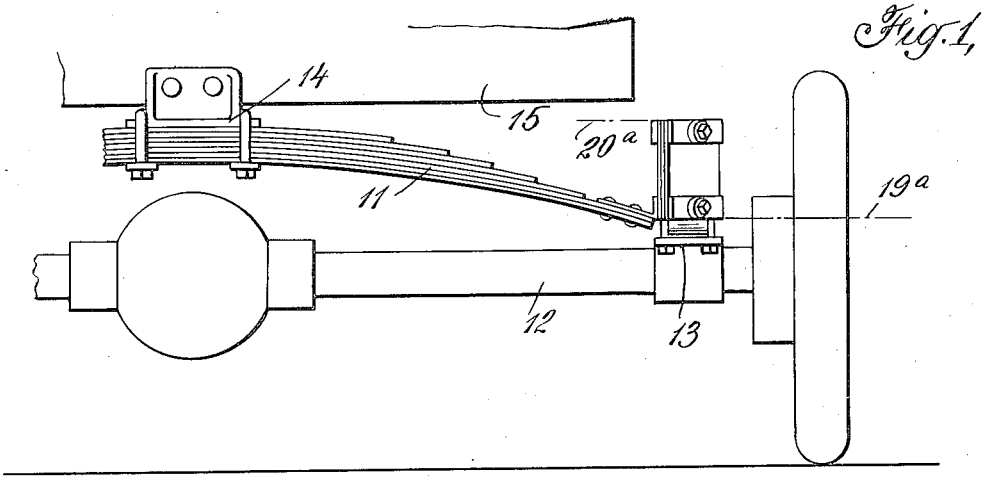
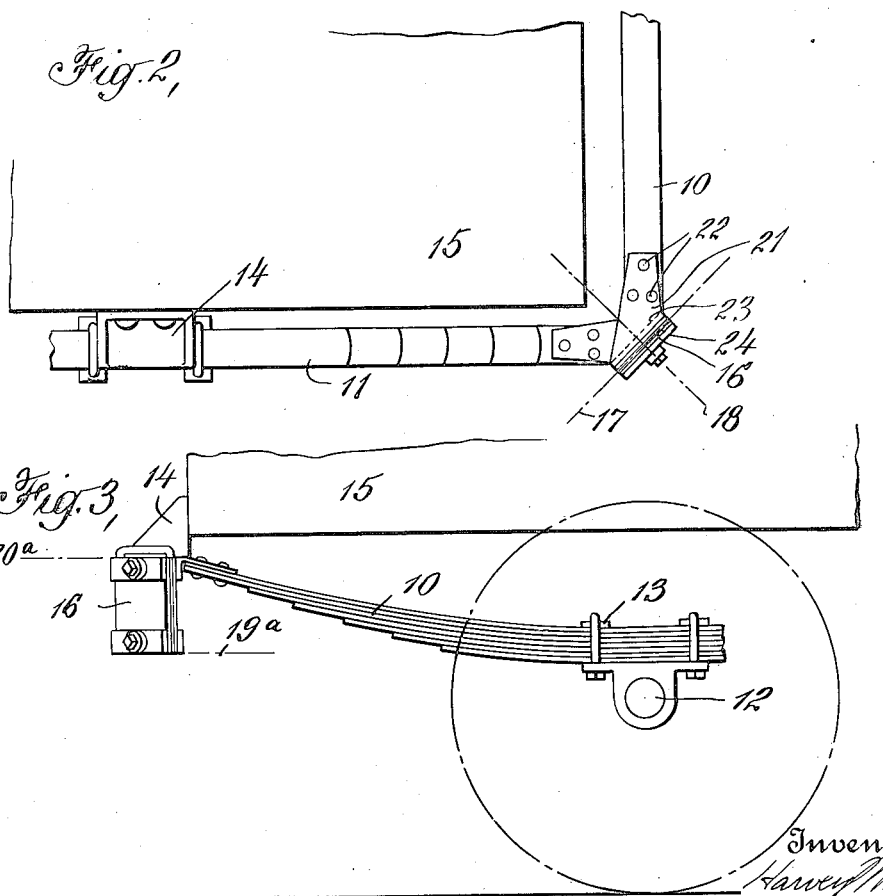
Inventor
Harvey W. Bell
By his Attorney
E. W. Marshall

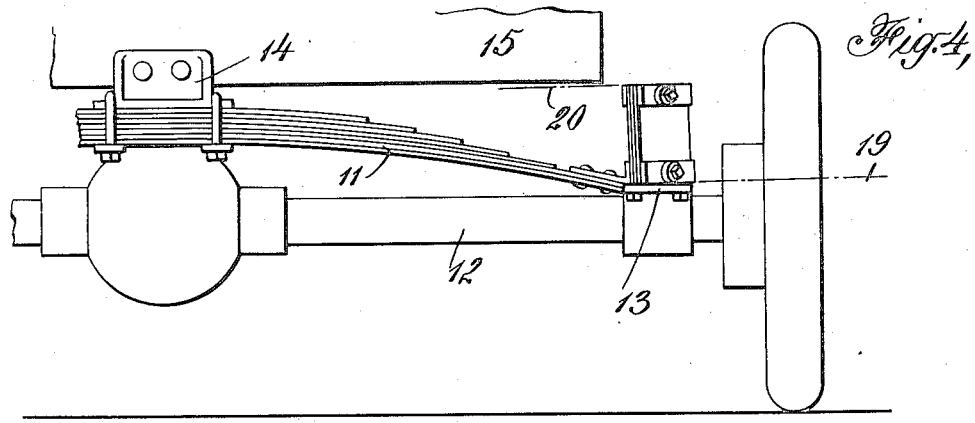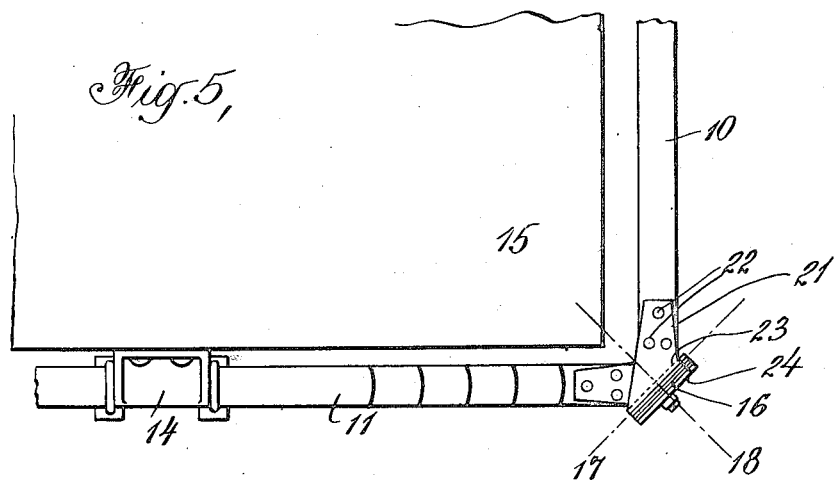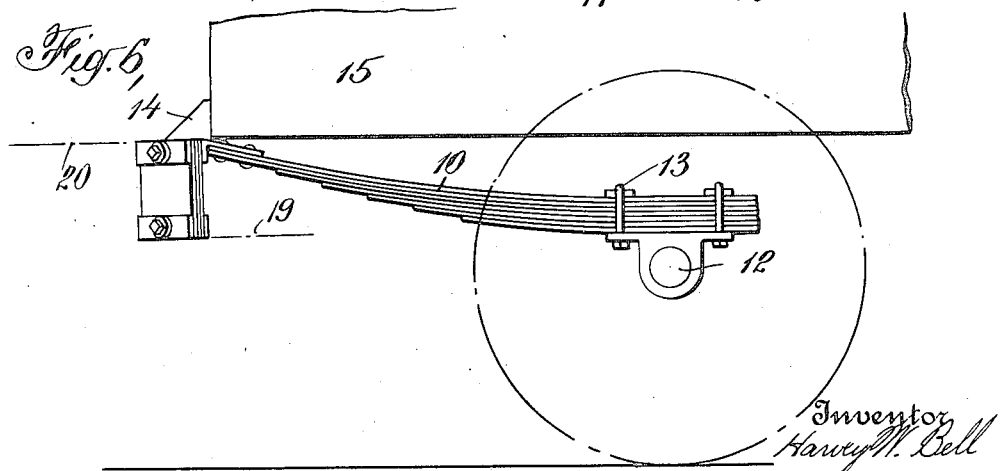

June 12, 1923.

H. W. BELL

SPRING SUSPENSION

Filed Dec. 24, 1920

Inventor
Harvey W. Bell
By his Attorney
E. W. Marshall

Patented June 12, 1923.

1,458,318

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

SPRING SUSPENSION.

Application filed December 24, 1920. Serial No. 432,843.

*To all whom it may concern:*

Be it known that I, HARVEY W. BELL, a citizen of the United States, and a resident of Yonkers, Westchester County, and State of New York, have invented certain new and useful Improvements in Spring Suspensions, of which the following is a specification.

My invention relates to spring suspensions for vehicles and particularly to those of the so-called "platform" type, wherein the vehicle body is suspended by means of longitudinally extending springs at the sides cooperating with a transversely arranged spring at the end of the vehicle.

Heretofore these angularly related springs have been connected by compound links pivotally engaged with the springs and articulated mid-length to allow for both longitudinal and transverse motion. These links necessarily are relatively heavy and complicated, require attention in the matter of lubrication and the like, and are objectionable furthermore in that they interfere with the full freedom of action of the angularly related springs.

It is the object of my invention to provide a connection or coupling between the angularly related springs or vehicle parts which will overcome these objections and defects, which will eliminate the need for lubrication or other attention, and which will allow for the full, free action of the springs.

Briefly, the invention comprises a connection between the angularly related springs or vehicle parts in the form of a link which is so connected with the angularly disposed parts as to compensate and allow for natural freedom of movement of such parts. Preferably these links consist of webs or strips of material rigidly secured at their opposite ends to the angularly related parts and disposed substantially at right angles to planes bisecting the angles of the angularly related parts.

Various other features of the invention will appear as the specification proceeds, which is to be read in conjunction with the accompanying drawings, wherein I have illustrated the invention embodied in practical commercial form. As this illustration is intended, however, primarily for purposes of disclosure, I wish it understood that the structure may be modified in various respects without departure from the true spirit of the invention, as will be apparent from the scope of the following specification and claims.

Figure 1 in the drawings referred to is a broken rear elevation illustrating the use of the invention with a common type of platform spring construction.

Figures 2 and 3 are broken plan and side views of the same.

In all three views mentioned the parts are illustrated substantially as they appear in the normal or "no load" condition.

Figures 4, 5 and 6 are views similar to Figures 1, 2 and 3 illustrating operation of the parts under load.

Figure 7:
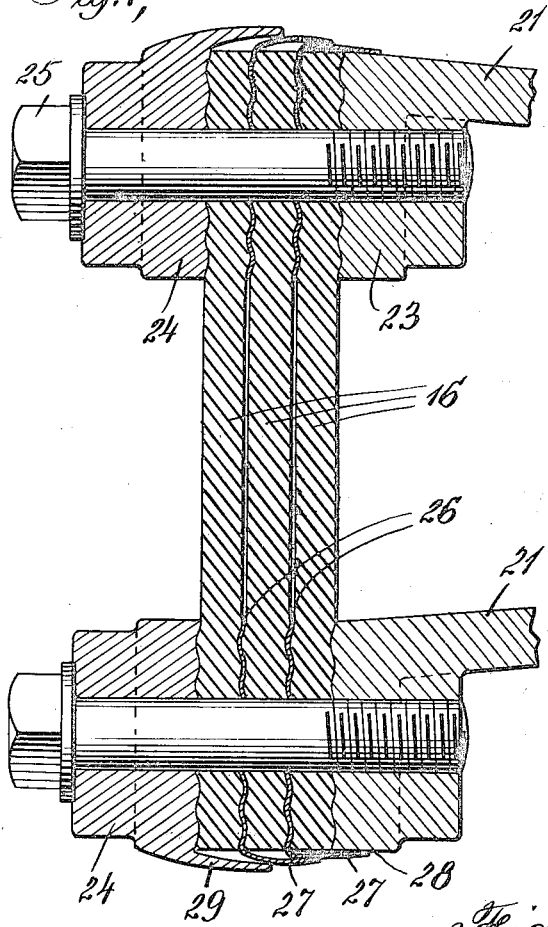
Figure 7 is a longitudinal sectional view of one of the links and the clamps by which it is held.
Figure 8:
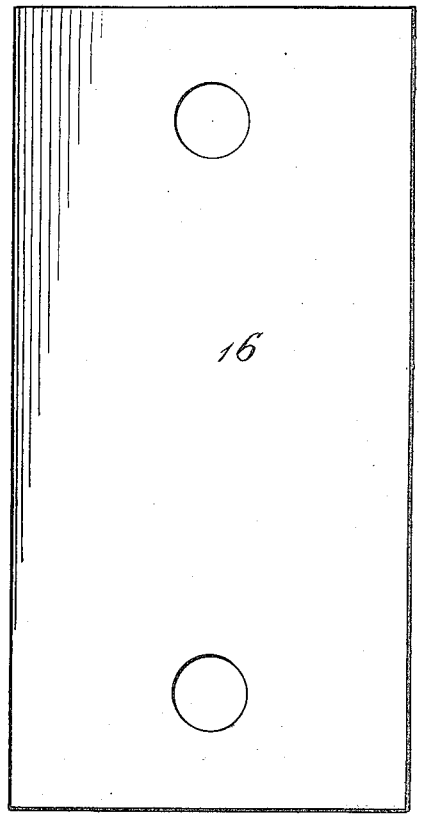
Figure 8 is a face view of one of the links.
Figure 9:
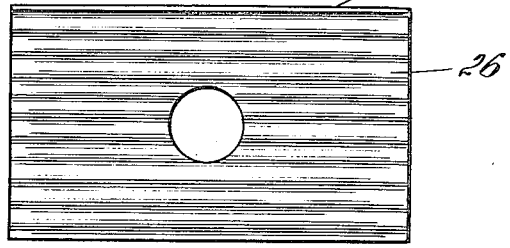
Figure 9 is a face view of one of the spacing washers.

The platform spring illustrated is of typical construction, involving a pair of longitudinally extending springs at the sides of the vehicle body, one of which is indicated at 10 and a transversely arranged intermediate spring 11 at the end of the vehicle body. The side springs 10 are clipped to the axle structure 12 at 13 and the transverse spring is secured intermediate its ends at 14 to the body structure 15.

The adjoining ends of the end and side springs are connected in the present disclosure by suspension links, shown as comprising relatively flat strips or webs 16 disposed with the flat sides thereof at a substantially equal angle to both the side and the end spring. This relation is possibly best shown in Figures 2 and 5 where it will be seen that the sides of the web, as indicated by the line 17, stand substantially at a right angle to the plane of a line 18 bisecting the angle between the two angularly related spring members.

This link, in the present disclosure, is rigidly or immovably secured at its opposite ends to the springs and its web is preferably constructed of a material such as canvas belting or the like which is relatively stiff and practically inflexible in its flat plane but is more or less freely flexible in a plane at right angles to the flat plane. This enables the link to flex with a "hinging" movement when necessary but I find that by reason of the particular angular disposition disclosed, a compensation is effected which practically eliminates bodily flexure of the link. This will be understood when it is considered that the rear spring flexing upwardly under load describes an arc which carries the outer extremity of the link fastened thereto upwardly (Figure 4) and that the side spring flexing downwardly under load, (Figure 6) describes an arc which carries the outer attached extremity of the link downwardly in such a way as to cant or incline the link bodily as shown. This feature will be clear from Figures 4 and 6 where I have indicated by a line 19 how the outer extremity of the lower end of the link swings outwardly and upwardly with the flexing of the rear spring, the line 20 in the same views showing how with the downward flexure of the side spring, the upper extremity of the link swings outwardly and downwardly from the approximately horizontal positions indicated by the lines 19ᵃ and 20ᵃ in Figures 1 and 3.

The flexure of the two springs, therefore, for the most part at least simply results in a bodily inclining movement of the link, both springs operating to turn the link in the same direction. The link therefore is practically free of twisting strains and needs only be heavy and strong enough to carry the weight of the load. The inherent flexibility of the link in a plane transverse to its flat sides is an advantage, however, in that it compensates for variations where one spring will flex more or at a different rate than the other related spring.

The structure of the clamps by which the ends of the links are rigidly secured to the adjoining ends of the springs is disclosed in detail in Figure 7 and as there shown each clamp consists of a base bracket 21 secured by bolts, rivets or other fastenings 22 (Figure 2) to the end of the spring and carrying a clamping face or jaw 23 disposed substantially at a 45 degree angle to the axis of the spring, with which cooperates a complementary jaw member or clamping plate 24, the movable jaw being secured to the fixed jaw by a bolt or other fastening 25. The base or attaching portions of these brackets may be shaped to fit the curvature of the spring leaves and they are furthermore shown as inclined at acute angles to the substantially horizontal planes of the clamping jaws (Figures 1 and 3) so as to bring the suspension links substantially vertical in the normal or unloaded condition and hence in the best position to carry the load.

Where the weight to be sustained is quite heavy I prefer to build the links of a plurality of strips superposed in substantially parallel relation as in Figure 7, and spaced at the ends in such relation by spacing elements in the nature of washers 26. These spacers and the contact faces of the clamp elements may be corrugated or otherwise provided with protuberances to firmly grip the strips, substantially as I have indicated.

Where only a single bolt is used at each clamp, I preferably provide means for preventing the strip from twisting rotatively in the clamp. The means for this purpose are shown in Figure 7 as angularly extended flanges 27 projecting from the ends of the spacers and extending over the ends of the strips into engagement with shoulders 28 on the fixed elements of the clamps. These flanges need not all extend into engagement with the shoulder because when the first spacer is thus anchored against rotation, the flange of the second washer need only project into overlapping relation over the first anchored member. The outer or movable clamp element 24 is shown as similarly held against rotative movement by an angularly extending anchorage flange 29 arranged to overlap the flange 27 of the adjacent spacing member. When the parts are set up as indicated in Figure 7 it will be clear that the spacers and movable clamping element will be anchored against rotation and in turn will prevent rotative twisting of the strips about the securing bolt.

In addition to the advantages heretofore pointed out, it will be noted that the suspension links arranged at the angle shown will resist side sway and will also offer opposition to longitudinal jerking movements, this by reason of the relative inflexibility of the links in their flat plane. As the links are rigidly held at their ends and as the flexure between the ends is ordinarily comparatively slight, and in some instances, not even apparent, the wear is inappreciable. While different materials may be employed, I find that rubber impregnated canvas belting of multi-ply thickness is well suited to this work since it is capable of carrying the load, is sufficiently flexible, is strongly resistant to compressive forces and is stiff and practically inflexible in the direction of its flat plane.

What I claim is:

1. In spring suspensions for vehicles, the combination with substantially longitudinal side springs and a substantially transverse spring at the ends of the longitudinal springs, of suspension links connected between the ends of the transverse and longitudinal springs and comprising continuous webs disposed substantially at right angles to plane bisecting the angles between the transverse and longitudinal springs.

2. In a vehicle construction, the combination with angularly related members, of a link connecting said members and comprising a rigidly held flexible web disposed substantially at a right angle to a plane bisecting the angle between the members.

3. In spring suspensions for vehicles, the combination with substantially longitudinally and transversely related springs, of a connecting web between said springs disposed substantially at a right angle to a plane bisecting the angle between the springs.

4. In spring suspensions for vehicles, the combination with substantially longitudinally and transversely related members, one at least of which is a spring, of a connecting web between said members disposed substantially at a right angle to a plane bisecting the angle between the members.

5. In combination with angularly related members of a vehicle, a link connecting said members and comprising a rigidly held flexible web disposed at an angle of substantially 45 degrees to the longitudinal axes of said members.

6. In combination with angularly related members of a vehicle, a link connecting said members and comprising a rigidly held flexible web standing substantially at equal angles to each of said members.

7. In a vehicle construction, the combination with angularly related members, of a connecting web between said members disposed substantially at a right angle to a plane bisecting the angle between the members and means for rigidly securing the web at its opposite ends to said members.

8. In a vehicle construction, the combination with angularly related springs, of a connecting web between said springs disposed substantially at a right angle to a plane bisecting the angle between the springs and means for rigidly securing the web at its opposite ends to said springs.

9. In a vehicle construction, the combination with angularly related members one at least of which is a spring, of a connecting web between said members disposed substantially at a right angle to a plane bisecting the angle between the members and means for rigidly securing the web at its opposite ends to said members.

10. In a vehicle construction, the combination with angularly related members, of a suspension link between said members and secured to said members at its opposite ends on lines substantially at right angles to a plane bisecting the angle between the members.

11. In a vehicle construction, the combination with angularly related members, of a suspension link between said members and rigidly secured to said members at its opposite ends on lines substantially at right angles to a plane bisecting the angle between the members.

12. In a spring suspension for vehicles, the combination with angularly related members one at least of which is a spring, of a suspension link connecting said members and comprising a substantially flat web disposed with its flat plane inclined to the longitudinal axis of the spring and means for rigidly securing the opposite end portions of said web to said members.

13. A supporting link for vehicle parts comprising a substantially flat web of flexible material and attaching brackets rigidly secured to the opposite ends of said web and standing substantially at right angles to each other.

14. A supporting link for vehicle parts comprising a substantially flat web of flexible material and attaching brackets rigidly secured to the opposite ends of said web and standing substantially at right angles to each other and at an angle to the flat plane of the web.

15. A supporting link for vehicle parts comprising a flexible web and an attaching bracket rigidly secured thereto and standing at an angle substantially 45 degrees to the flat plane of the web.

16. A supporting link for vehicle parts comprising a substantially flat flexible web and attaching brackets rigidly secured to the opposite ends of said web and standing substantially at equal angles to the flat plane of the web.

17. In a vehicle construction, the combination with angularly related members, of a connecting web between said members and consisting of a substantially flat strip of material having the characteristics of canvas belting and disposed with its flat plane substantially at equal angles to both of the angularly related members.

18. In combination with a link of the character described, a clamp comprising parts between which the end portion of the link is held and a member non-rotatably held by the clamp and engaging over the end of the link to hold the same against rotative movement in the clamp.

19. In combination with a link of the character described, a clamp comprising parts between which the end portion of the link is gripped and a member extending over the end of the link and engaging one of the parts of the clamp.

20. In combination with a link of the character described, a clamp comprising parts between which the end portion of the link is gripped and a holding member carried by one of said parts of the clamp and engaging over the end of the link to confine the same against rotative movement in the clamp.

21. In combination with a link of the character described, a clamp comprising parts between which the end portion of the link is held, a member non-rotatably held by the clamp and engaging over the end of the link to hold the same against rotative movement in the clamp and a bolt securing the parts of the clamp together, the member aforesaid having an opening for the passage of said bolt.

22. In combination, a supporting link consisting of a plurality of substantially flat flexible strips arranged in superposed relation, a clamp rigidly securing said strips at one end and a spacing washer between said strips and engaging over the end of one of the strips to confine the same against rotative movement in the clamp.

23. In combination, a supporting link consisting of a plurality of substantially flat flexible strips arranged in superposed relation, a clamp rigidly securing said strips at one end, a spacing washer between said strips and engaging over the end of one of the strips to confine the same against rotative movement in the clamp and a holding extension carried by the clamp and engaging over the end of one of the other strips to confine the same against rotative motion.

24. In a vehicle construction, the combination with angularly related relatively movable members, of a connecting web between said members disposed in a plane substantially at right angles to a plane bisecting the angle between said members.

25. In a vehicle construction, the combination with angularly related relatively movable members of a flexible connecting web between said members disposed in a plane substantially at right angles to a plane bisecting the angle between said members.

26. In a vehicle construction, the combination with angularly related relatively movable members of a flat connecting web between said members disposed substantially at right angles to a plane bisecting the angle between said members.

27. In a vehicle construction, the combination with angularly related, relatively movable, spaced apart members of a web connecting said members and disposed substantially at a right angle to a plane bisecting the angle between said members.

28. In a vehicle construction, the combination with angularly related, relatively movable, spaced apart members of a flexible web connecting said members and disposed substantially at a right angle to a plane bisecting the angle between said members.

29. In a vehicle construction, the combination with angularly related, relatively movable, spaced apart members of a substantially flat, flexible web connecting said members and disposed substantially at a right angle to a plane bisecting the angle between said members.

In witness whereof, I have hereunto set my hand this 13th day of December, 1920.

HARVEY W. BELL.